United States Patent
Ahmed et al.

(10) Patent No.: US 10,298,154 B2
(45) Date of Patent: May 21, 2019

(54) RESTART STRATEGY FOR SYNCHRONOUS RELUCTANCE MACHINES

(71) Applicant: ABB Technology AG, Zurich (CH)

(72) Inventors: Sara Ahmed, Morrisville, NC (US); Kibok Lee, Seoul (KR); Srdjan Lukic, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/179,328

(22) Filed: Jun. 10, 2016

(65) Prior Publication Data

US 2017/0359005 A1 Dec. 14, 2017

(51) Int. Cl.
| | |
|---|---|
| *H02P 27/08* | (2006.01) |
| *H02P 1/02* | (2006.01) |
| *H02P 21/34* | (2016.01) |
| *H02P 25/08* | (2016.01) |

(52) U.S. Cl.
CPC .............. *H02P 1/029* (2013.01); *H02P 21/34* (2016.02); *H02P 25/08* (2013.01); *H02P 27/08* (2013.01)

(58) Field of Classification Search
CPC .......... H02P 27/06; H02P 23/08; H02P 27/08; H02P 2207/01; B60L 11/1803; B60L 15/025; H02M 7/53875; H02M 7/53873
USPC .......... 318/400.02, 700, 798, 800, 801, 807, 318/808, 811, 599
See application file for complete search history.

(56) References Cited

U.S. PATENT DOCUMENTS

| | | | | |
|---|---|---|---|---|
| 4,740,738 A | * | 4/1988 | El-Antably | H02P 3/065 318/701 |
| 5,740,880 A | * | 4/1998 | Miller | B62D 5/0463 180/446 |
| 6,628,099 B2 | * | 9/2003 | Iwaji | H02P 6/34 318/432 |
| 6,741,060 B2 | * | 5/2004 | Krefta | B60L 3/0023 318/727 |

(Continued)

OTHER PUBLICATIONS

H. Pan et al., "Improving the Start and Restart Behavior Through State Recognition of AC Drives," IEEE, Proceedings of the Power Conversion Conference, vol. 2, pp. 589-594, Japan, Aug. 3, 1997.

(Continued)

*Primary Examiner* — Rina I Duda
(74) *Attorney, Agent, or Firm* — Taft Stettinius & Hollister LLP; J. Bruce Schelkopf

(57) ABSTRACT

Unique systems, methods, techniques and apparatuses of a synchronous reluctance machine (SynRM) control are disclosed. One exemplary embodiment is a control device structured to operate a converter coupled to a synchronous reluctance machine and receive measurements of current. The device comprises a converter controller structured to detect a power supply restoration, operate the converter so as to transmit a series voltage vectors relative to the stationary reference frame to the stator of the synchronous reluctance machine, receive current measurements following the transmission of each of the voltage vectors, estimate the rotor position using the characteristics of the voltage vector and the received current measurements corresponding to at least one voltage vector, estimate the rotor speed using the characteristics of the voltage vectors and the received current measurements corresponding to at least two voltage vectors, and operate the converter so as to apply voltage to the stator.

16 Claims, 4 Drawing Sheets

(56) References Cited

U.S. PATENT DOCUMENTS

| | | | | |
|---|---|---|---|---|
| 6,784,634 B2* | 8/2004 | Sweo | ............... | H02P 9/007 |
| | | | | 290/46 |
| 7,375,934 B2* | 5/2008 | Wang | ............... | H02P 29/02 |
| | | | | 318/432 |
| 8,044,537 B2* | 10/2011 | Asplund | ............ | H02M 7/7575 |
| | | | | 307/82 |
| 8,054,030 B2 | 11/2011 | Son et al. | | |
| 2006/0061923 A1 | 3/2006 | Wang et al. | | |
| 2006/0087277 A1 | 4/2006 | Norell et al. | | |
| 2010/0084935 A1 | 4/2010 | Jadric et al. | | |
| 2013/0169074 A1* | 7/2013 | Hussain | ............ | H02K 5/128 |
| | | | | 310/49.43 |
| 2013/0285588 A1* | 10/2013 | Ito | ............ | H02P 23/14 |
| | | | | 318/490 |

OTHER PUBLICATIONS

K. Suzuki et al., "Stability Improvement of V/F Controlled Large Capacity Voltage-Source Inverter Fed Induction Motor," IEEE, Conference Record of the 2006 IEEE Industry Applications Conference Forty-First IAS Annual Meeting41st IAS Annual Meeting, vol. 1, pp. 90-95, USA, Oct. 8, 2006.

T. Horie et al., "Experimental Study on a Restarting Procedure at Coasting Condition for a Rotational Angle Sensorless PMSM," IEEJ Journal of Industry Applications, pp. 131-137, vol. 3, No. 2, Mar. 1, 2014.

T. Yamakawa et al., "Starting Procedure of Rotation Sensorless PMSM at Coasting Condition for Railway Vehicle Traction," Electrical Engineering in Japan, pp. 56-63, vol. 169, No. 2, Japan, Jul. 20, 2009.

S. Taniguchi et al., "Starting Procedure of Rotational Sensorless PMSM in the Rotating Condition," IEEE, IEEE Transactions on Industry Applications, vol. 45, No. 1, pp. 194-202, USA, Jan. 20, 2009.

P.D.C. Perera et al., "A Sensorless, Stable V/f Control Method for Permanent-Magnet Synchronous Motor Drives," IEEE, IEEE Transactions on Industry Applications, pp. 783-791, vol. 39, No. 3, May 2003.

International Search Report and Written Opinion, PCT Appln. No. PCT/US2017/35929 dated Aug. 26, 2017, 10 pgs.

* cited by examiner

RESTART STRATEGY FOR SYNCHRONOUS RELUCTANCE MACHINES

BACKGROUND

The present disclosure relates generally to synchronous reluctance machines (SynRMs). In some industrial settings, SynRMs are preferred over other machines such as induction machines and permanent magnet synchronous machines due to having a higher power density compared to induction machines and a lower cost compared to permanent magnet synchronous machines. Some SynRMs are controlled using scalar control when high dynamic performance is not required in order to ensure easier commissioning by the end-user. As a result, only a few parameters about the machine are known, such as the V-Hz ratio and machine ratings. Existing SynRMs suffer from a number of shortcomings and disadvantages. There remain unmet needs including improving restart capabilities of SynRMs following a power system fault. For instance, following a power system fault current SynRM control systems operating in scalar mode must wait until the machine rotor comes to a complete stop before restarting the SynRM. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for synchronous reluctance machine control systems. Further embodiments, forms, objects, features, advantages, aspects and benefits of the disclosure shall become apparent from the following description and drawings

DETAILED DESCRIPTION OF ILLUSTRATIVE EMBODIMENTS

Figure 1:
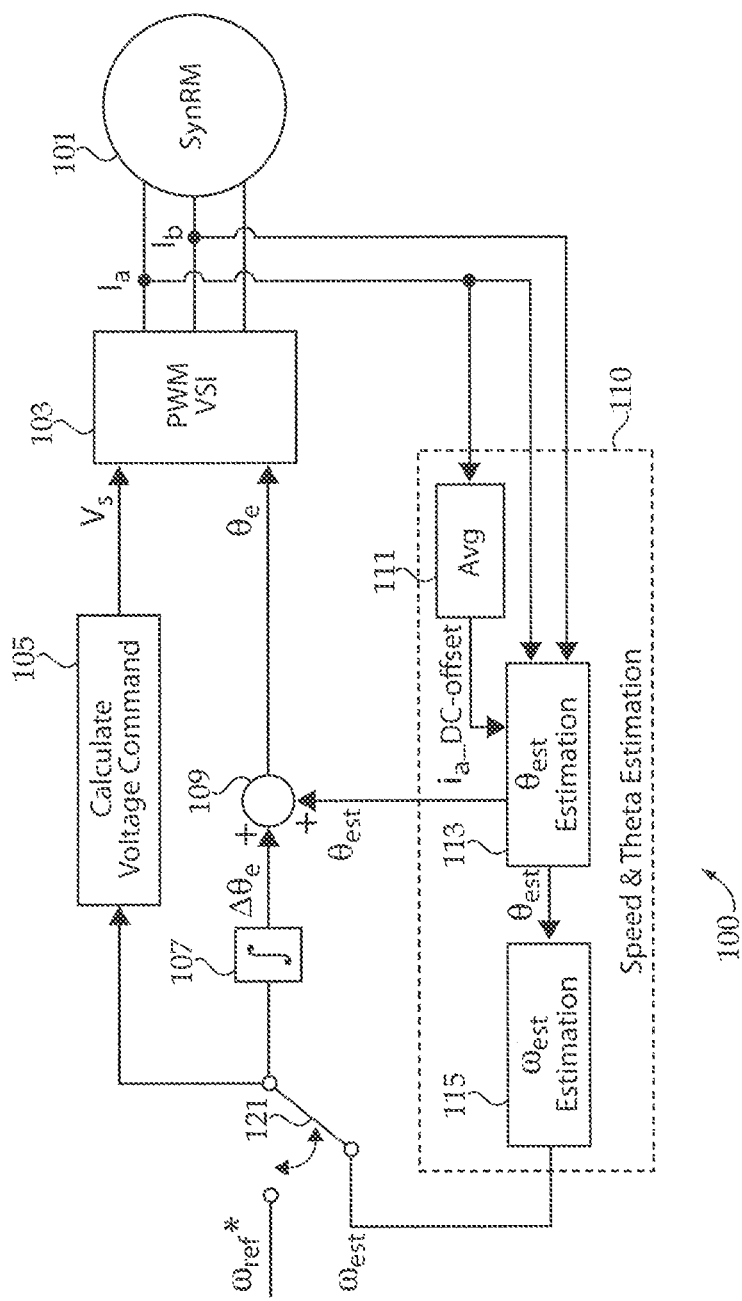
FIG. 1 is a block diagram illustrating an exemplary control system.

With reference to FIG. 1 there is illustrated an exemplary control system 100 structured to restart a synchronous reluctance machine with a rotating rotor following a power failure. It shall be appreciated that control system 100 may be configured to control any synchronous reluctance machine accommodating the varying machine parameters of different machines.

Control system 100 is coupled to a multi-phase synchronous reluctance machine SynRM 101 and power converter 103. Machine 101 includes a stator and a rotor and is structured to receive AC power from power converter 103 with the stator of machine 101. In certain embodiments, machine 101 may be structured to drive a high inertia load, such as a flywheel, centrifuge, chipper, debarker, or a shredder, to name but a few examples. The rotor speed and torque output of machine 101 may be controlled by varying the voltage and frequency of the power provided to the stator of machine 101, also known as scalar control. It shall be appreciated by those having ordinary skill in the art that control system 100 may alternatively control machine 101 using vector control or direct torque control without significant modification to the embodiments described herein. Machine 101 operation can be represented in the rotor reference frame with the following equation, where p denotes the derivative operator, $R_s$ is the winding resistance, $v_d$ and $v_q$ are the d-axis and q-axis stator input voltages, $i_d$ and $i_q$ are the d-axis and q-axis stator currents, $L_d$ and $L_q$ are the d-axis and q-axis stator inductances and $\omega_r$ is the electrical angular frequency of the rotor:

$$\begin{bmatrix} v_d \\ v_q \end{bmatrix} = \begin{bmatrix} R_s + pL_d & -\omega_r L_q \\ \omega_r L_d & R_s + pL_q \end{bmatrix} \begin{bmatrix} i_d \\ i_q \end{bmatrix} \qquad (1)$$

Converter 103 includes a plurality of switching devices. In the illustrated embodiment, converter 103 is a pulse width modulation controlled voltage source inverter. In other embodiments, converter 103 may be of another type of converter structured to provide controlled power to synchronous reluctance machine 101 and communicate with control system 100. Power converter 103 is structured to receive power from a power supply, convert the power to AC power with a controlled output voltage and frequency, and provide the converted power to machine 101. In certain embodiments, control system 100 transmits a plurality of actuation signals to the plurality of switching devices of converter 103 so that converter 103 converts the received power to AC with a desired voltage and frequency according to scalar control. In other embodiments, control system 100 transmits voltage and frequency input values to converter 103 and converter 103 generates actuation signals structured to operate the switches of converter 103 such that converter 103 outputs AC power with the desired voltage and frequency.

From time to time, the power supply providing power to machine 101 may experience a power failure event, such as the elimination or reduction of power provided to machine 101 by way of converter 103. Following a power failure event, a power restoration event occurs when the power supply returns to pre-power failure event operation. Control system 100 is structured to detect a power supply failure event, detect a power restoration event, and restart machine 101 following the power restoration event without the rotor of machine 101 coming to a complete stop, also known as a flying restart. In order to perform a flying restart, control system 100 requires voltage/frequency rating data for machine 101, but does not require data related to other machine parameters such as inductances values, which are usually unknown to the user and also vary by temperature and current, causing inaccuracies in both speed and theta estimation. The flying restart operation performed by control system 100 successfully estimates the rotor speed and position such that machine 101 may be restarted without causing overcurrent and braking torque.

Control system 100 includes a voltage command module 105, an integrator module 107, and an addition module 109. In normal operation, voltage command module 105 and integrator 107 receive rotor speed reference value $\omega_{ref}^*$ by way of a selector 121. Voltage command module 105 is structured to generate a reference voltage $V_s$ using $\omega_{ref}^*$ and transmit value $V_s$ to converter 103. Integrator module 107 is structured to receive $\omega_{ref}^*$ by way of selector 121 and calculate the change in rotor position $\Delta\theta_e$ by integrating $\omega_{ref}^*$. Since $\theta_{est}$ is only calculated following a power restoration event, $\Delta\theta_e$ is then transmitted to to converter 103.

Following a power restoration event, rotor speed reference value $\omega_{ref}^*$ is unavailable. Therefore, control system 100 is structured to estimate rotor position and rotor speed with position and speed estimator 110. First, voltage command module 105 transmits a series of voltage values to converter 103 which in turn provides a series of voltage vectors, also known as electric pulses, having a pulse width with a fixed duty cycle to machine 101. In certain embodiments, the series of voltage vectors includes three voltage vectors. In other embodiments, the series of voltage vectors includes only two voltage vectors. At the end of each pulse, each phase current is measured. The measurement may be direct or indirect, based on physical sensors or virtual sensors, and may also be based on combinations of the foregoing. For example, one or more sensors may measure electrical characteristics such as voltage, magnetic flux, or resistance in order to determine the phase current, or a sensor may directly measure the electrical characteristic of phase current. With averaging module 111, the DC-offset current is identified in one of the phase currents. Using the phase current measurements $i_a$ and $i_b$ is for the series of voltage vectors, the rotor speed $\omega_{est}$ and rotor position $\theta_{est}$ are estimated with rotor position module 113 and rotor speed module 115. Voltage command module 105 is structured to generate a command voltage $V_s$ using $\omega_{est}$ and transmit value $V_s$ to converter 103. The command voltage is calculated by using the rated v/f ratio. The frequency of stator voltage is an estimated value. Integrator module 107 is structured to receive $\omega_{est}$ by way of selector 121 and calculate the change in rotor position $\Delta\theta_e$ by integrating $\omega_{est}$. Addition module 109 is structured to combine the change in rotor position $\Delta\theta_e$ and the estimated rotor position $\theta_{est}$ to calculate the current rotor position $\theta_e$, which is provided to converter 103. Using the received data, converter 103 is structured to apply voltage to the stator. The applied stator voltage is increased gradually from zero until the voltage reaches the rated v/f ratio. For example, the applied stator voltage may be gradually increased at a rate two times greater than the rated voltage slope of the motor. One purpose of the gradual increase in stator voltage is to prevent the inrush current which can be generated by applying the step voltage. Finally, using a series of current measurements, converter 103 is structured to resume normal operation after stabilizing the voltage command input using a feedback controller measuring converter 103 output current.

Figure 2:
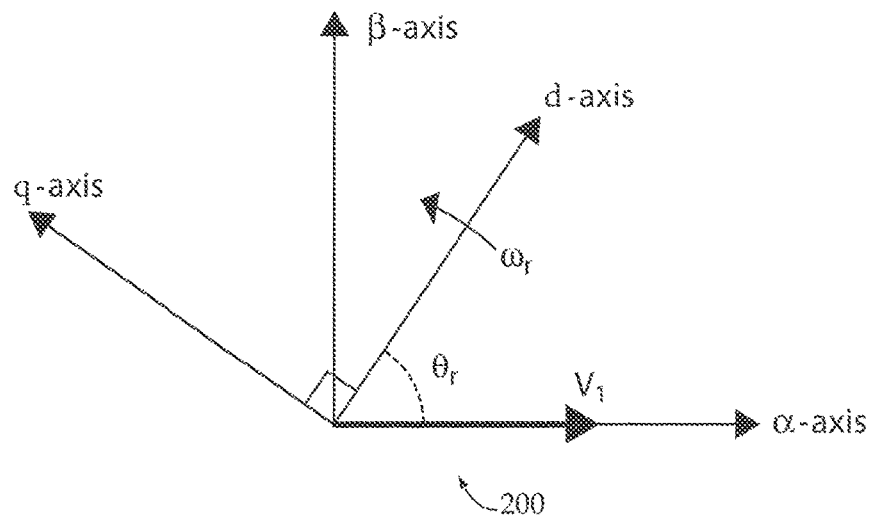
FIG. 2 is a graph illustrating a voltage vector transmitted by the exemplary control system in FIG. 1.

With reference to FIG. 2 there is a graph 200 illustrating the relationship between a stationary reference frame denoted by an α-axis and a β-axis and a rotor reference frame denoted by a d-axis and a q-axis. Graph 200 illustrates the two reference frames of an electric machine, such as machine 101 in FIG. 1. The α-axis is perpendicular to the α-axis and the d-axis is perpendicular to the q-axis. The angle θr between the α-axis and the d-axis represents the position of the rotor with respect to the stator. The speed of the rotor reference frame with respect to the stationary reference frame is denoted $\omega_e$. In order for an exemplary control system, such as control system 100 in FIG. 1, to perform a flying restart operation following a power failure, control system 100 is structured to estimate rotor position $\theta_r$ and rotor speed $\omega_r$. Graph 200 also includes a non-zero voltage vector V1 aligned with the α-axis in the stationary reference frame. The first step towards performing a flying restart with control system 100 is to excite machine 101 with voltage vector V1. In other embodiments, voltage vector V1 is a non-zero vector not aligned with the α-axis. Voltage vector V1 of the stationary reference frame can be expressed as the following set of equations in rotor reference frame where $V_{dc}$ is the amplitude of the voltage vector pulse:

$$V_d = \frac{2V_{dc}}{3}\cos(\theta_r) \qquad (2)$$

$$V_q = -\frac{2V_{dc}}{3}\sin(\theta_r)$$

Figure 3:
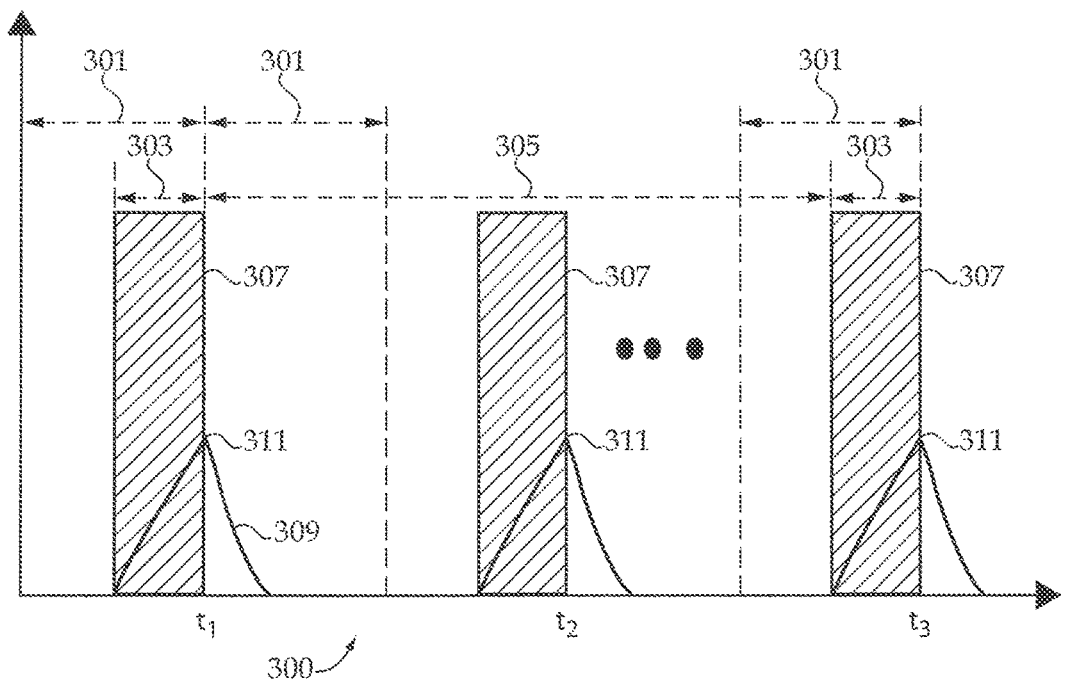
FIG. 3 is a graph illustrating a current response to the series of voltage vectors transmitted by the exemplary control system in FIG. 1.

With reference to FIG. 3 there is a graph 300 illustrating a series of voltage vector pulses 307 each having a pulse width 301 and provided to a machine from an exemplary control system, such as machine 101 and control system 100 of FIG. 1. The width of each pulse is a percentage of a switching period 301 and the time between two of the voltage vectors 307 is denoted by time period 305. It is important to note the width of each pulse 307 is not determined by the switching frequency because the increased width of such a voltage vector pulse may cause an over-current in stator winding with a small inductance and a rotor spinning at a high speed. The pulse width 303 is determined with consideration given to over-current conditions and estimation error caused by current sensing. In one embodiment, the current response to the first of the series of voltage vector pulses 307 is evaluated to determine the pulse width 303. For example, a pulse width 303 may be 80% of the width of switching period 301. A current curve 309 depicts the amplitude of current flowing to machine 101. At the end of each voltage vector pulse 307, current curve 309 reaches a local maximum 311. Control system 100 is structured to receive measurements of each local maximum 311.

When applying voltage vector 307, it is assumed that width 303 is a short period of time, much smaller than the stator time constants ($\tau_d = L_d/R_s$, $\tau_q = L_q/R_s$). The stator resistance can therefore be neglected. Using Laplace transform, the resulting three phase currents can be calculated as the following set of equations:

$$i_a(t) = \frac{2V_{dc}t_{pulse}}{3}\left(\frac{1}{2}\left(\frac{1}{L_d}+\frac{1}{L_q}\right)+\frac{1}{2}\cos(2\theta_r)\left(\frac{1}{L_d}-\frac{1}{L_q}\right)\right) \qquad (3)$$

$$i_b(t) = \frac{2V_{dc}t_{pulse}}{3}\left(-\frac{1}{4}\left(\frac{1}{L_d}+\frac{1}{L_q}\right)+\frac{1}{2}\cos\left(2\theta_r-\frac{2\pi}{3}\right)\left(\frac{1}{L_d}-\frac{1}{L_q}\right)\right)$$

-continued $$i_c(t) = \frac{2V_{dc}t_{pulse}}{3}\left(-\frac{1}{4}\left(\frac{1}{L_d}+\frac{1}{L_q}\right)+\frac{1}{2}\cos\left(2\theta_r+\frac{2\pi}{3}\right)\left(\frac{1}{L_d}-\frac{1}{L_q}\right)\right)$$

The three phase currents obtained by applying voltage vectors 307 consist of two parts, the DC-offset current and the oscillated portion generated by the rotor speed and position.

Figure 4:
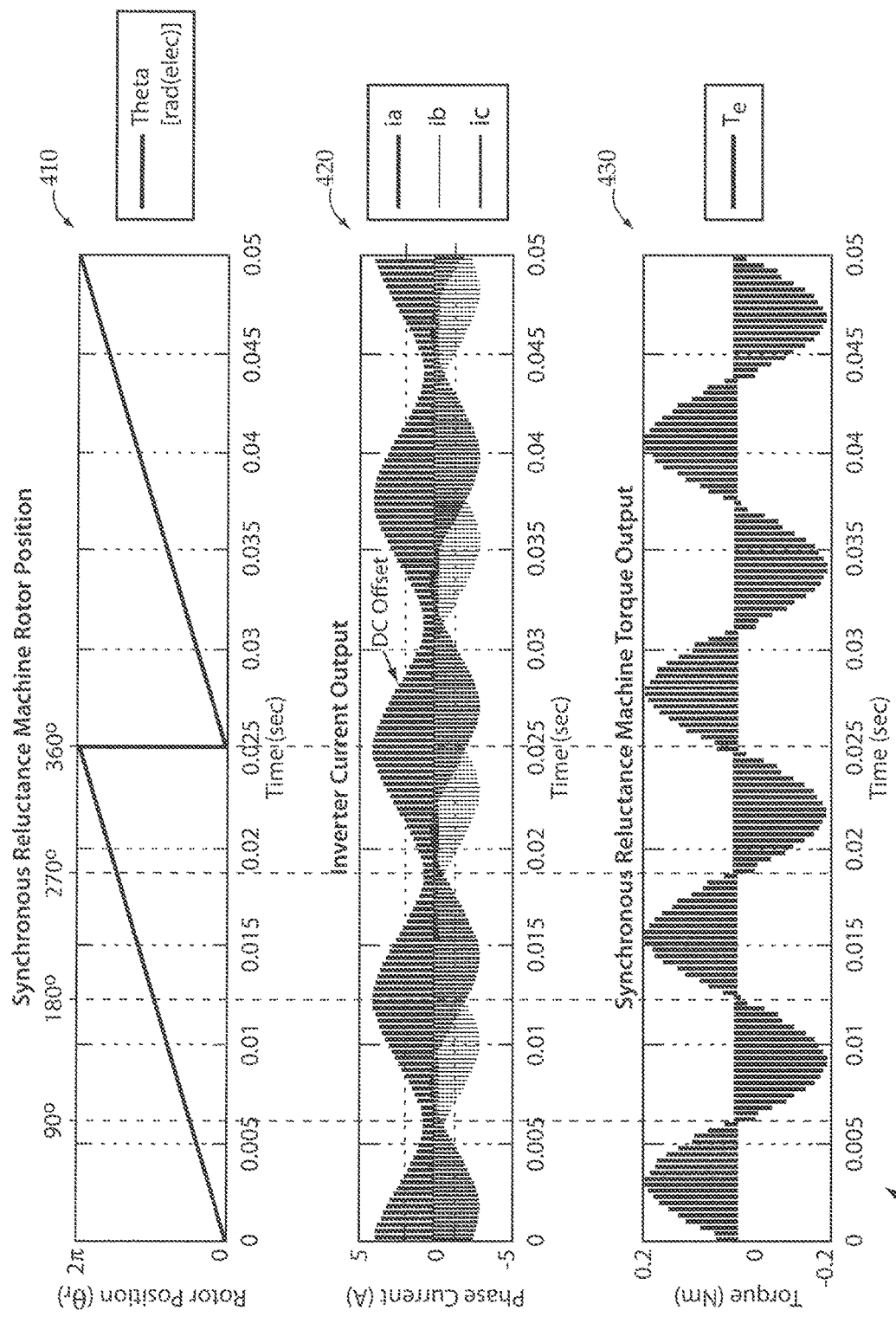
FIG. 4 is a graph illustrating current sampling with the control system in FIG. 1.

With reference to FIG. 4 there is illustrated a plurality of graphs 400 illustrating the response of machine 101 to the series of voltage vectors transmitted by control system 100. As illustrated in the graphs 400, the rotor speed is 1,200 rpm and the applied voltage pulse duty is 80%. The plurality of graphs 400 illustrate a time period of operation between 0.0 seconds and 0.5 seconds. Graph 410 illustrates the actual rotor position, graph 420 illustrates the current generated in machine 101 in response to the series of voltage vectors, and graph 430 illustrates the torque generated by the series of voltage vectors.

As illustrated in graph 420, the phase current generated in machine 101 in response to the series of voltage vectors includes a DC-offset. In order to use three phase current to estimate the rotor speed and position, the DC-offset terms should be eliminated. The DC-offset can be obtained by averaging each phase current for at least one revolution of the rotor and subtracting the determined average from the measured phase current. Three phase currents $i_{a\_1}$, $i_{b\_1}$ and $i_{c\_1}$ without DC-offset is represented with the following equations:

$$i_{a\_1}(t) = K\cos(2\theta_r) \quad (4)$$

$$i_{b\_1}(t) = K\cos\left(2\theta_r - \frac{2\pi}{3}\right)$$

$$i_{c\_1}(t) = K\cos\left(2\theta_r + \frac{2\pi}{3}\right)$$

where K is the following:

$$K = \frac{V_{dc}t_{pulse}}{3}\left(\frac{1}{L_d}-\frac{1}{L_q}\right)$$

By taking the Clarke transform, two phase current in stationary reference frame can be obtained as:

$$\begin{bmatrix} i_{\alpha\_1} \\ i_{\beta\_1} \end{bmatrix} = T(0)\begin{bmatrix} i_{a\_1} \\ i_{b\_1} \\ i_{c\_1} \end{bmatrix} \quad (5)$$

where T(0) represents the following:

$$\frac{2}{3}\begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix}$$

Using the results of equation (5), rotor position can be estimated by using the following equation, where $\theta_{est}$ is the estimated rotor angle, $\theta_r$ is the actual rotor angle and $\Delta\theta_{error}$ is the error term of estimated rotor angle:

$$\theta_{est} = \theta_r + \Delta\theta_{error} = \frac{1}{2}\tan^{-1}(I_{\beta\_1}/I_{\alpha\_1}) \quad (6)$$

As shown by equation (6), since $\theta_{est}$ can be determined using only two phase current measurements, control system 100 does not require knowledge of the inductance values of machine 101 to estimate rotor position and rotor speed. $\Delta\theta_{error}$ is determined by the accuracy of current sensing. In certain embodiments, $\Delta\theta_{error}$ is less than ten degrees in order to safely restart machine 101. As a result, the proposed method can estimate the rotor position by using the measured three phase current and DC-offset obtained by using the average method.

Rotor speed can be estimated by using two voltage vector pulses. If the interval time between two pulses is short enough, the rotor speed can be assumed as the constant. Therefore, the rotor speed can be estimated by using two estimated rotor position values. The rotor speed can be calculated with the following equation where $t_{pulse}$ is the time which a voltage vector pulse is applied to the stator winding, r is the time between two voltage vector pulses shown in FIG. 3 and $\omega_{est}$ is the estimated electrical angular frequency of the rotor:

$$\omega_{est} = \frac{\theta_{est2}-\theta_{est1}}{t_{pulse}+\tau} \quad (7)$$

As time between two pulses τ is longer, the rotor speed estimation can be more precisely represented with the following equation:

$$\omega_{est} = \frac{\theta_{est2}-\theta_{est1}}{t_{pulse}+\tau} = \frac{\theta_{r2}-\theta_{r1}+2\Delta\theta_{error}}{t_{pulse}+\tau} = \omega_r + \frac{2\Delta\theta_{error}}{t_{pulse}+\tau} \quad (8)$$

When choosing the interval time τ, the rated speed of the rotor should be considered so that the interval τ is shorter than the time taken for one electrical revolution, as represented by the following formula:

$$\theta_{r2}-\theta_{r1}=\omega_r\cdot(\tau+t_{pulse})<2\pi \quad (9)$$

If the second pulse is applied after the rotor completes one revolution, the rotating speed of the rotor is more likely to be estimated incorrectly.

The following equations represent the actual and estimated rotor speeds, where N is the rotor rotation number between two rotor position values, or is an actual speed and $\omega_{est}$ is the estimated speed. The estimated speed will be the same with the actual speed only when N is zero.

$$\begin{cases} \omega_r = \frac{(\theta_{r2}+2\pi\cdot N)-\theta_{r1}}{t_{pulse}+\tau} & \text{(Actual)} \\ \omega_{est} = \frac{\theta_{r2}-\theta_{r1}}{t_{pulse}+\tau} & \text{(Estimated)} \end{cases} \quad (10)$$

Figure 5:
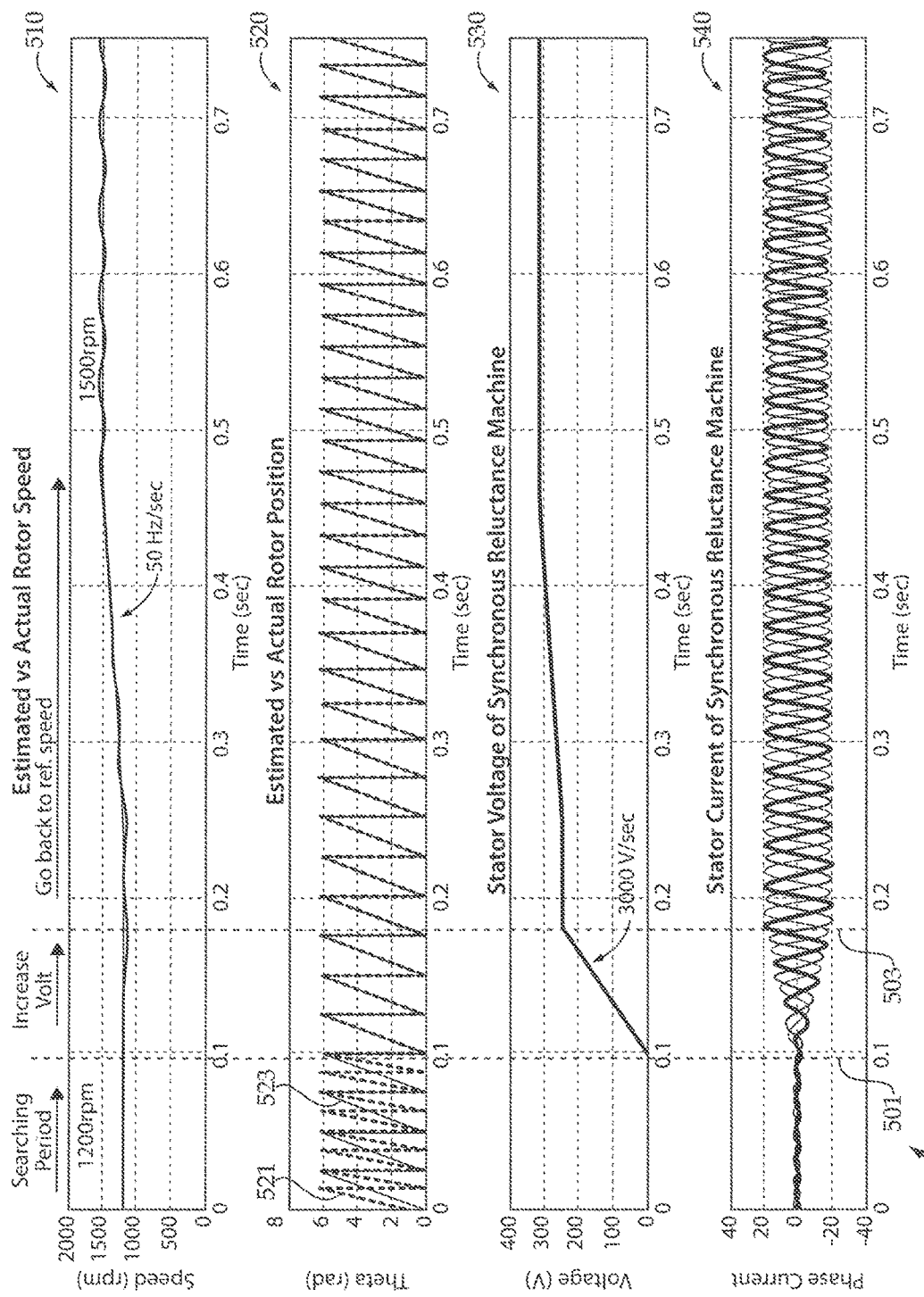
FIG. 5 is a graph illustrating a flying restart of a synchronous reluctance machine executed by the exemplary control system in FIG. 1.

With reference to FIG. 5, there is illustrated a plurality of graphs 500 illustrating machine 101 operation following a power restoration event. Between 0.0 seconds and time 501, graphs 500 illustrate the time period where rotor speed and position are estimated by control system 100. Between time 501 and time 503, control system 100 applies a gradually increasing voltage to the stator of machine 101. At time 503, machine 101 reaches the rated v/f ratio. Between time 503 and 0.7 seconds, graphs 500 illustrating the operation of the stabilization loop and the return to normal operation. Graph 510 illustrates the estimated and actual values of rotor speed; graph 520 illustrates the estimated rotor position 521 and actual rotor position 523; graph 530 illustrates machine 101 stator voltage; and graph 540 illustrates machine 101 stator current.

Further written description of a number of exemplary embodiments shall now be provided. One embodiment is a synchronous reluctance machine system comprising a synchronous reluctance machine including a stator and rotor; a converter structured to receive power from a power supply and supply AC power to the synchronous reluctance machine; at least one sensor structured to measure an electrical characteristic of current flowing between the converter and the synchronous reluctance machine; a converter controller structured to: detect a power supply restoration after a power supply fault, operate the converter so as to transmit a series of electric pulses with a calculated width and amplitude to the stator of the synchronous reluctance machine, receive a series of electrical characteristic measurements from the at least one sensor, estimate the rotor position using at least one of the received electrical characteristic measurements of at least one electric pulse, width information of the at least one electric pulse, and amplitude information of the at least one electric pulse, estimate the rotor speed using the received current measurements corresponding to at least two electric pulses, electric pulse width data, and electric pulse amplitude width information of the at least two electric pulses, and amplitude information of the at least two electric pulses, and operate the converter to apply voltage to the stator using the estimated rotor speed and position before the actual rotor speed decreases to zero.

In certain forms of the foregoing system, the electrical characteristics received by the converter controller are measurements of current flowing from converter to the synchronous reluctance machine. In certain forms, the converter is an AC/AC converter structured to receive AC power from the power supply, convert the received AC power to DC power, and convert the DC power to AC power, and provide the converted AC power to the synchronous reluctance machine. In certain forms, the electric pulses are equivalent voltage vectors relative to the stationary reference frame of the stator and the width of each electric pulse is less than the stator time constant. In certain forms, the electric pulses are transmitted to the synchronous electric machine within one revolution of the rotor. In certain forms, the converter controller is structured to receive v/f ratio data, operate the converter using scalar control and to calculate the voltage to be gradually applied to the stator using the v/f ratio data and an estimated stator frequency. In certain forms, the synchronous reluctance machine is structured to drive a high inertia load.

Another exemplary embodiment is a control device structured to operate a converter coupled to a synchronous reluctance machine and receive measurements of current flowing from the converter to the synchronous reluctance machine comprising a converter controller structured to detect a power supply restoration event, operate the converter so as to transmit a series voltage vectors relative to the stationary reference frame to the stator of the synchronous reluctance machine, receive current measurements following the transmission of each of the voltage vectors, estimate the rotor position using the characteristics of the voltage vector and the received current measurements corresponding to at least one voltage vector, estimate the rotor speed using the characteristics of the voltage vectors and the received current measurements corresponding to at least two voltage vectors, and operate the converter so as to apply voltage to the stator calculated using the estimated rotor speed and position.

In certain forms of the foregoing device, the width of the electric pulse is structured to prevent overcurrent in the synchronous reluctance machine. In certain forms, the rotor speed and position are estimated by eliminating the DC-offset component of the current measurement and transforming the current measurements to the stationary reference frame. In certain forms, voltage applied to the stator calculated using the estimated rotor speed and position is increased from 0 to a command voltage value. In certain forms, the device controls the converter using scalar control and the command voltage value is calculated using the v/f ratio rating of the synchronous reluctance machine and an estimated frequency. In certain forms, the inductance values of the synchronous reluctance machine are not needed to estimate rotor position and speed.

A further exemplary embodiment is a method for restarting a synchronous reluctance machine with a rotating rotor following a power failure, the method comprising detecting a power supply restoration event with a control system; operating a converter with the control system so as to transmit a series of electric pulses with a predetermined width and amplitude to the stator of the synchronous reluctance machine; calculating current response to the series of electric pulses with the control system; estimating the rotor position with the control system using the calculated current response corresponding to at least one electric pulse, electric pulse width data, and electric pulse amplitude data; estimating the rotor speed with the control system using the received current measurements corresponding to at least two electric pulses, electric pulse width data, and electric pulse amplitude data; and operating the converter with the control system so as to gradually apply voltage to the stator using the estimated rotor speed and position before the actual rotor speed decreases to zero.

In certain forms of the foregoing method, estimating the rotor position includes identifying the DC-offset current by average the current measurements of one phase of the synchronous reluctance machine stator windings and eliminating the DC-offset current. In certain forms, the method comprises stabilizing the current of the converter using a current feedback loop. In certain forms, the method comprises resuming normal operation of the converter. In certain forms, resuming normal operation of the converter includes operating the synchronous reluctance machine using scalar control by determining the voltage and frequency control values of the scalar control method using a rotor speed reference value provided to the control system. In certain forms, the converter is operated to transmit a series of electric pulses such that the electric pulse are transmitted to the stator of the synchronous reluctance machine within one revolution of the rotor and such that the width of each electric pulse does not cause an overcurrent in the synchronous electric machine. In certain forms, the control system operates the synchronous reluctance machine using scalar control.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A synchronous reluctance machine system comprising:
a synchronous reluctance machine including a stator and rotor;
a converter structured to receive power from a power supply and supply AC power to the synchronous reluctance machine;
a plurality of sensors configured to provide measurements corresponding to a plurality of currents flowing from the converter to respective phases of the synchronous reluctance machine;
a converter controller structured to:
operate the converter in a normal operating mode in which a rotor speed reference value is selected as a control input by the converter controller, and a voltage reference value and a rotor position value are determined in response to the rotor speed reference value and provided as outputs to control the converter,
detect a power supply fault, the power supply fault interrupting the normal operating mode,
detect a power supply restoration after the power supply fault, the rotor speed reference value being unavailable after the power supply restoration,
operate the converter to transmit a plurality of electric pulses to the stator of the synchronous reluctance machine,
after each of the plurality of electrical pulses, receive from the plurality of sensors a corresponding plurality of measurements corresponding to the plurality of currents flowing from the converter to the respective phases of the synchronous reluctance machine,
determine a DC offset value in response to a first one of the plurality of measurements corresponding to a first one of the respective phases,
determine an estimated rotor position in response to the first one of the plurality of measurements, a second one of the plurality of measurements corresponding to a second one of the respective phases, and the DC offset value,
determine an estimated rotor speed in response to the estimated rotor position,
operate the converter in a restart operating mode in which the control input selected by the converter is changed from the rotor speed reference value to the estimated rotor speed, and the voltage reference value and the rotor position value are determined in response to the estimated rotor speed and provided as control inputs to the converter.

2. The system of claim 1 wherein the plurality of sensors are physical current sensors configured to directly measure current in the respective phases of the synchronous reluctance machine.

3. The system of claim 1 wherein the converter is an AC/AC converter structured to receive AC power from the power supply, convert the received AC power to DC power, and convert the DC power to AC power, and provide the converted AC power to the synchronous reluctance machine.

4. The system of claim 1 wherein the electric pulses are equivalent voltage vectors relative to the stationary reference frame of the stator and the width of each electric pulse is less than the stator time constant.

5. The system of claim 4 wherein the electric pulses are transmitted to the synchronous electric machine within one revolution of the rotor.

6. The system of claim 1 wherein the converter controller is structured to receive v/f ratio data, operate the converter using scalar control and to calculate the voltage to be gradually applied to the stator using the v/f ratio data and an estimated stator frequency.

7. The system of claim 1 wherein the synchronous reluctance machine is structured to drive a high inertia load.

8. A control device structured to operate a converter coupled to a synchronous reluctance machine and receive measurements of current flowing from the converter to the synchronous reluctance machine comprising:
a converter controller structured to:
operate the converter in a normal operating mode in which a rotor speed reference value is selected as a control input by the converter controller, and a voltage reference value and a rotor position value are determined in response to the rotor speed reference value and provided as outputs to control the converter,
detect a power supply fault, the power supply fault interrupting the normal operating mode,
detect a power supply restoration event, the rotor speed reference value being unavailable after the power supply restoration,
operate the converter to transmit plurality of voltage pulses to the synchronous reluctance machine,
receive a plurality of current measurements corresponding to a plurality of currents flowing from the converter to respective phases of the synchronous reluctance machine following the transmission of each of the plurality of voltage pulses,
determine a DC offset value in response to a first one of the plurality of measurements corresponding to a first one of the respective phases, determine an estimated rotor position in response to the first one of the plurality of measurements, a second one of the plurality of measurements corresponding to a second one of the respective phases, and the DC offset value, determine an estimated rotor speed in response to the estimated rotor position, and operate the converter in a restart operating mode in which the control input selected by the converter is changed from the rotor speed reference value to the estimated rotor speed, and the voltage reference value and the rotor position value are determined in response to the estimated rotor speed and provided as control inputs to the converter.

9. The control device of claim 8 wherein the width of the plurality of voltage pulses is structured to prevent overcurrent in the synchronous reluctance machine.

10. The device of claim 8 wherein in the restart operating mode a voltage applied to the stator is calculated using the estimated rotor speed and position and is increased from 0 to a command voltage value.

11. The device of claim 10 wherein the command voltage value is calculated using the v/f ratio rating of the synchronous reluctance machine and an estimated frequency.

12. A method for restarting a synchronous reluctance machine with a rotating rotor following a power failure, the method comprising:

operating a converter to drive the synchronous reluctance machine in a normal operating mode in which a rotor speed reference value is selected as a control input, and a voltage reference value and a rotor position value are determined in response to the rotor speed reference value and provided as outputs to control the converter;

detecting a power supply fault, the power supply fault interrupting the normal operating mode;

detecting a power supply restoration event, the rotor speed reference value being unavailable after the power supply restoration event;

operating the converter to transmit a plurality of voltage pulses to the stator of the synchronous reluctance machine;

receiving a corresponding plurality of measurements corresponding to the plurality of currents flowing from the converter to a plurality of respective phases of the synchronous reluctance machine;

determining a DC offset value in response to a first one of the plurality of measurements corresponding to a first one of the respective phases, determining an estimated rotor position in response to the first one of the plurality of measurements, a second one of the plurality of measurements corresponding to a second one of the respective phases, and the DC offset value;

determining an estimated rotor speed in response to the estimated rotor position;

of the scalar control method using a rotor speed reference value provided to the operating the converter in a restart operating mode in which the control input selected by the converter is changed from the rotor speed reference value to the estimated rotor speed, and the voltage reference value and the rotor position value are determined in response to the estimated rotor speed and provided as control inputs to the converter.

13. The method of claim 12 wherein estimating the rotor position includes identifying the DC-offset current by average the current measurements of one phase of the synchronous reluctance machine stator windings and eliminating the DC-offset current.

14. The method of claim 12 comprising stabilizing the current of the converter using a current feedback loop.

15. The method of claim 12 wherein the converter is operated to transmit a series of electric pulses such that the electric pulses are transmitted to the stator of the synchronous reluctance machine within one revolution of the rotor and such that the width of each electric pulse does not cause an overcurrent in the synchronous electric machine.

16. The method of claim 12 wherein the synchronous reluctance machine is operated using scalar control.

* * * * *